(12) United States Patent
Willemin et al.

(10) Patent No.: US 12,444,554 B2
(45) Date of Patent: Oct. 14, 2025

(54) PARTIAL SCANNING IN A HYBRID SWITCH ARRAY

(71) Applicant: Logitech Europe S.A., Lausanne (CH)

(72) Inventors: Jérémie Willemin, Zhubei (TW);
Yu-Sen Chen, Hsinchu County (TW);
Keson Tsao, Lausanne (CH); Laurent Plancherel, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/905,075

(22) Filed: Oct. 2, 2024

(65) Prior Publication Data

US 2025/0191858 A1 Jun. 12, 2025

Related U.S. Application Data

(63) Continuation of application No. 18/457,974, filed on Aug. 29, 2023, now Pat. No. 12,119,187.

(51) Int. Cl.
*G06F 3/023* (2006.01)
*G06F 3/02* (2006.01)
*H01H 13/70* (2006.01)

(52) U.S. Cl.
CPC ........... *H01H 13/70* (2013.01); *G06F 3/0202* (2013.01); *G06F 3/0231* (2013.01)

(58) Field of Classification Search
None
See application file for complete search history.

(56) References Cited

U.S. PATENT DOCUMENTS

| 11,150,741 | B1 | 10/2021 | Stoeckli et al. | |
| 2022/0206591 | A1 | 6/2022 | Pawar et al. | |
| 2023/0168748 | A1* | 6/2023 | Stoeckli | G06F 3/023 |
| | | | | 345/163 |

FOREIGN PATENT DOCUMENTS

| CN | 114461080 A | 5/2022 |
| CN | 217484846 U | 9/2022 |

OTHER PUBLICATIONS

CN202411182240.8, "Notice of Decision to Grant", Aug. 4, 2025, 6 pages.
CN202411182240.8, "Office Action", Jul. 3, 2025, 5 pages.

\* cited by examiner

*Primary Examiner* — Carl Adams
(74) *Attorney, Agent, or Firm* — Kilpatrick Townsend & Stockton LLP

(57) ABSTRACT

A keyboard system including a plurality of hybrid key structures configured in an array of subarrays, each of the plurality of hybrid key structures configured within a subarray and including a depressible element, a first type of key switch configured to generate a first signal when the depressible element is activated, a second type of key switch configured to generate a second signal when the depressible element is activated, and processor(s) configured to: receive a first signal from an activated hybrid key structure when its corresponding depressible element is activated; determine a corresponding subarray that the activated hybrid key structure is configured within; scan the corresponding subarray for a generated second signal; detect the generated second signal from the corresponding subarray; identify the activated hybrid key structure based on the detected, generated second signal; and register a key press for the identified activated hybrid key structure.

18 Claims, 14 Drawing Sheets

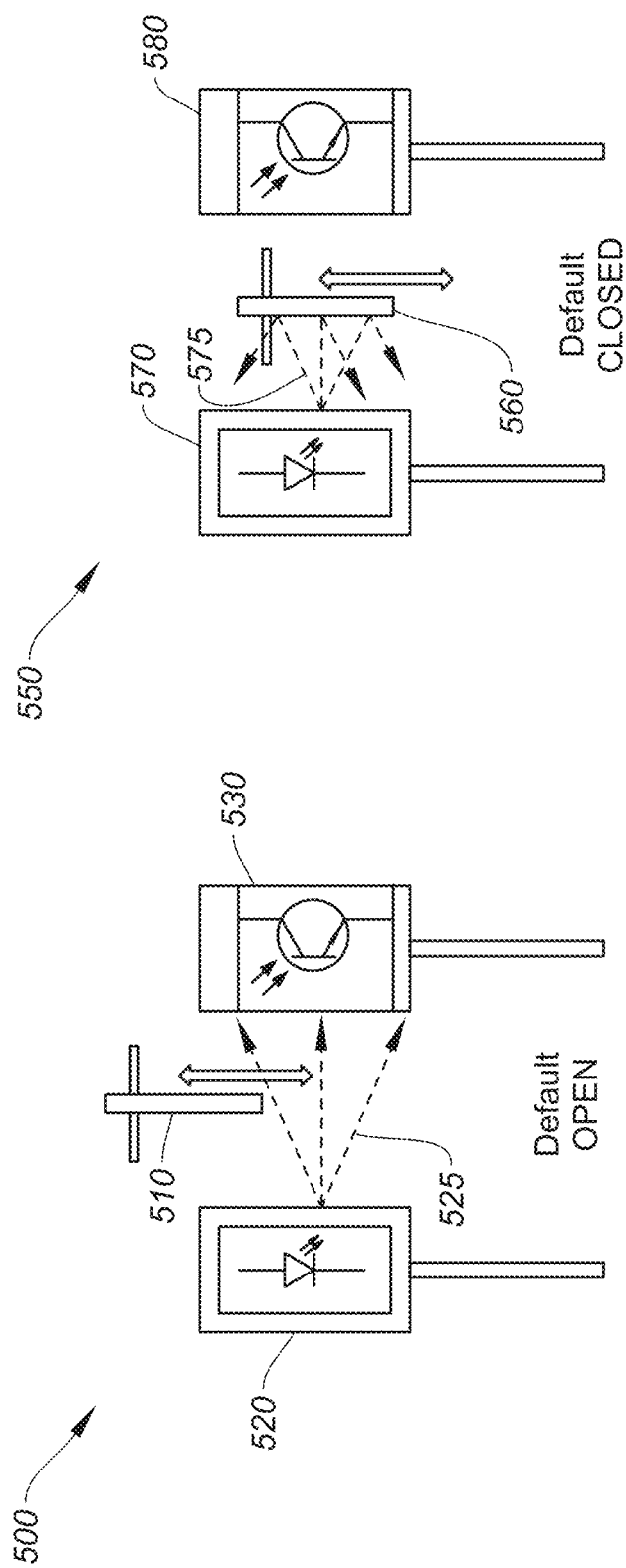

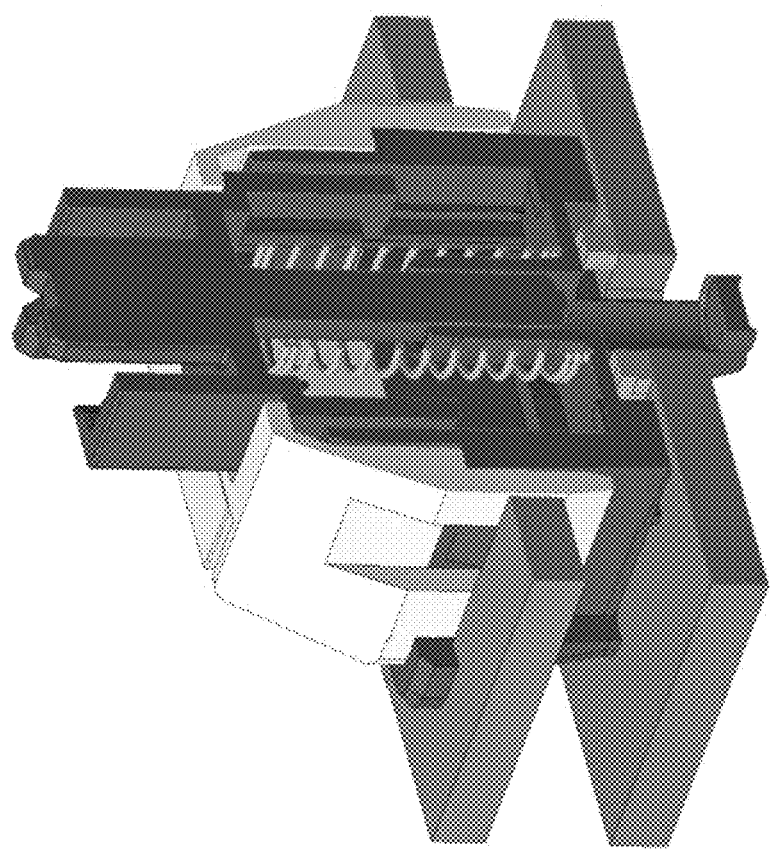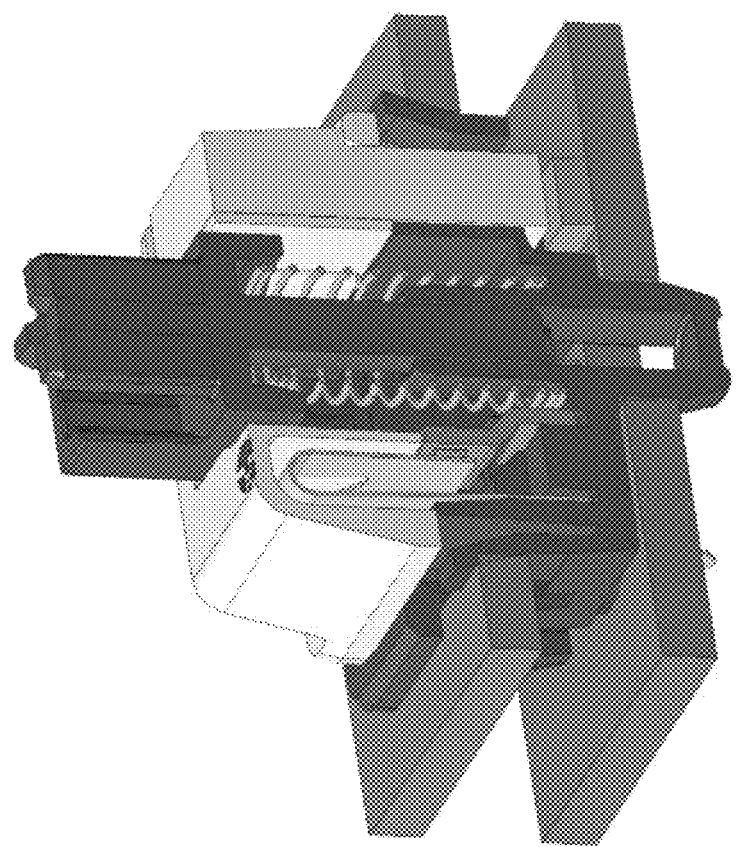
FIG. 8

PARTIAL SCANNING IN A HYBRID SWITCH ARRAY

CROSS REFERENCE PARAGRAPH FOR PRIORITY

This application is continuation of U.S. Non-Provisional application Ser. No. 18/457,974, filed on Aug. 29, 2023, and titled "PARTIAL SCANNING IN A HYBRID SWITCH ARRAY," which is hereby incorporated by reference in its entirety for all purposes.

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktop computers, laptop computers, netbook computers, gaming consoles, tablets and "phablet" computers, smart phones, personal digital assistants, wearable devices (e.g., smart watches, glasses), virtual reality (VR) and/or augmented reality (AR) headsets and systems, and the like.

Input devices have undergone many marked improvements over the last several decades. In some contemporary input devices, such as computer mice and keyboards, buttons and/or keys often employ contact-based switches for click detection. Contact-based switches have been in the market for many years and have significantly improved in quality and price, but are subject to wear-and-tear over extended use due to repeated contact-based actuation. This can often result in unreliable performance characteristics and low signal-to-noise ratios that would be unacceptable to even casual users, much less the typically more discerning users in the gaming community. As such, better solutions are needed.

Unless otherwise indicated herein, the materials described in this section are not prior art to the claims in this application and are not admitted to be prior art by inclusion in this section.

BRIEF SUMMARY

In certain embodiments, a keyboard system comprises: a plurality of hybrid key structures configured in an array, the array comprised of a plurality of subarrays, wherein each of the plurality of key structures in configured within any one of the plurality of subarrays and includes: a depressible element; a first type of key switch configured to generate a first signal when the depressible element is activated; and a second type of key switch configured to generate a second signal when the depressible element is activated; and one or more processors communicatively coupled to each of the plurality of hybrid key structures and configured to: receive the first signal from an activated hybrid key structure when its corresponding depressible element is activated; determine a corresponding subarray that the activated hybrid key structure is configured within; scan the corresponding subarray for a generated second signal; detect the generated second signal from the corresponding subarray; identify the activated hybrid key structure based on the detected, generated second signal; and register a key press for the identified activated hybrid key structure. In some aspects, the first type of key switch is a contact-based key switch, and wherein the second type of key switch is a contactless key switch. In some embodiments, the first type of key switch is a galvanic mechanical key switch, and wherein the second type of key switch is an optical key switch.

In certain embodiments, scanning the corresponding subarray includes driving the second type of key switch in each of the hybrid key structures in the corresponding subarray and reading their output for the generated second signal. In some implementations, scanning the corresponding subarray for detecting the corresponding second signal is performed in response to receiving the first signal. In certain embodiments, generating the first signal consumes less than one tenth times a power of generating the second signal. In some cases, the keyboard system generates a radio frequency (RF) report with key press data that includes all identified activated hybrid key structures within a scan period comprised of a plurality of scan intervals, where the corresponding subarray(s) are scanned during scan intervals of the plurality of scan intervals that are closest in time to a generation of a next RF report. In some aspects, the array includes rows and columns, wherein each column includes a plurality of rows of hybrid key structures, wherein each column corresponds to one of the plurality of subarrays, and wherein each column corresponds to a different one of the plurality of subarrays than the remaining columns. In further embodiments, they keyboard system includes a multiplexor configured to consolidate a total number of rows and columns by sharing same rows and columns resulting in a fewer number of input/output (I/Os) lines in the keyboard system. The one or more processors can be disposed in the keyboard system.

In some embodiments, a method of operating an input device comprises: receiving, by one or more processors on the input device, a first signal from one of a plurality of subarrays, each subarray of the plurality of subarrays including a different set of a plurality of hybrid key structures, each of the plurality of key structures including a first type of key switch and a second type of key switch, wherein the first signal is generated by the first type of key switch of at least one of the plurality of hybrid key structures of the one of the plurality of subarrays, wherein the plurality of subarrays in combination form an array; identifying the one of the plurality of subarrays where the first signal is generated; scanning the identified one of the plurality of subarrays for a second signal generated by the second type of key switch; detecting the generated second signal from the identified one of the plurality of subarrays; identifying an activated key structure that is producing the generated second signal; and registering a key press for the identified, activated key structure. In some cases, the first type of key switch is a contact-based key switch, and the second type of key switch is a contactless key switch. In some embodiments, the first type of key switch is a galvanic mechanical key switch, and the second type of key switch is an optical key switch. The second type of key switch can be different than the first type of key switch.

In some aspects, scanning the identified one of the plurality of subarrays includes driving the second type of key switch in each of the hybrid key structures in the identified one of the plurality of subarrays and reading their output for the generated second signal. In some implementations, scanning the identified one of the plurality of subarrays for detecting the detected, generated second signal is performed in response to receiving the first signal. In some aspects, the input device generates a radio frequency (RF) report with key press data that includes all identified activated hybrid key structures within a scan period comprised of a plurality of scan intervals, wherein the corresponding subarray(s) are scanned during scan intervals of the plurality of scan intervals that are closest in time to a generation of a next RF report. In certain embodiments, the array includes rows and columns, wherein each column includes a plurality of rows of hybrid key structures, wherein each column corresponds to one of the plurality of subarrays, and wherein each column corresponds to a different one of the plurality of subarrays than the remaining columns. The one or more processors can be disposed in the input device. In some aspects, the input device is a keyboard.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 5A shows an example of an operation of an optical switch sensor with a default open configuration, according to certain embodiments;

FIG. 5B shows an example of an operation of an optical switch sensor with a default closed configuration, according to certain embodiments;

FIG. 8 shows a side cutaway view of the second example of the key structure with a hybrid key switch architecture, according to certain embodiments;

DETAILED DESCRIPTION

Figure 1:
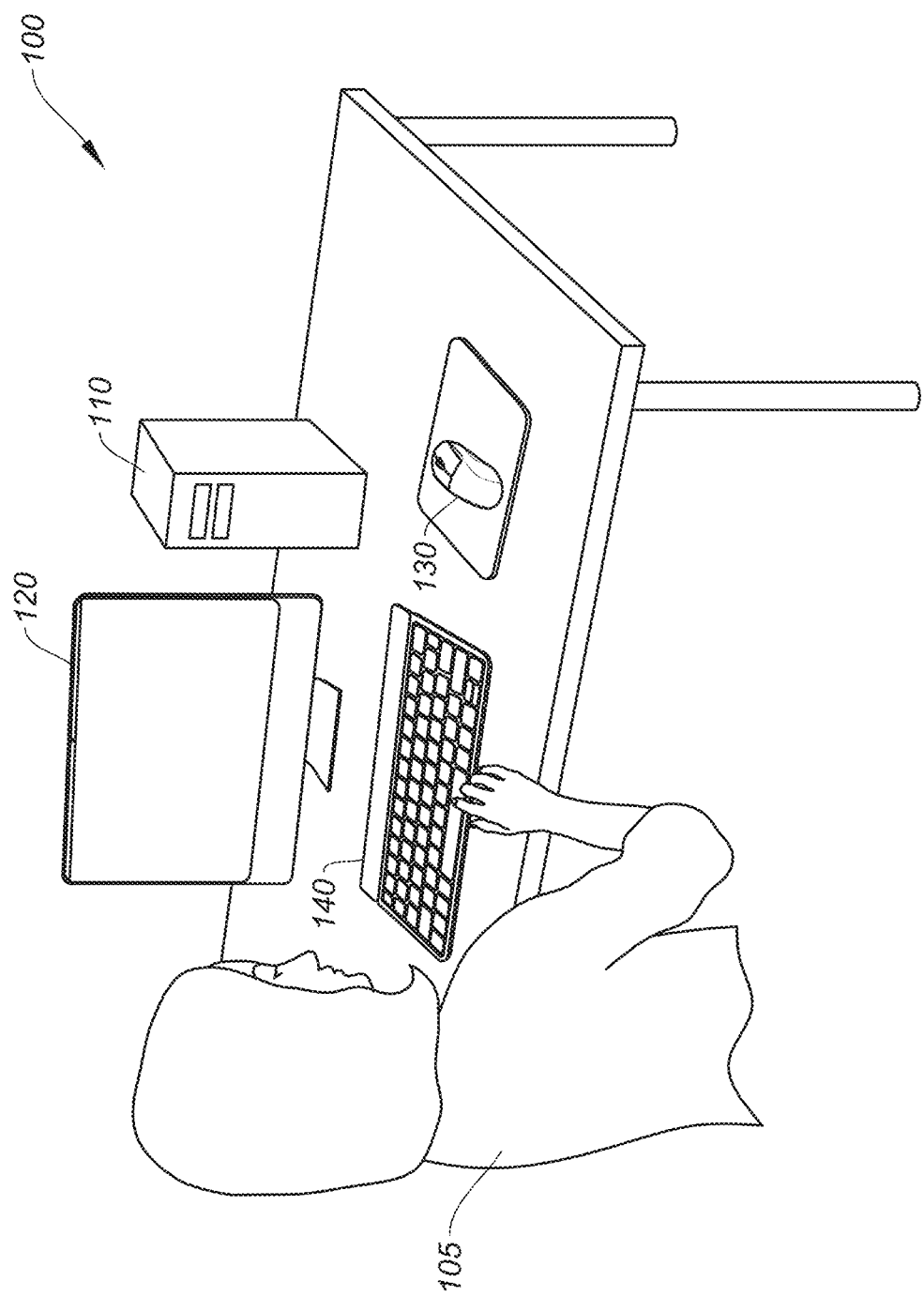
FIG. 1 shows an example of a computer system that can include any of a variety of host computing devices and computer peripheral devices, including computer peripheral devices (e.g., a computer mouse, keyboard, etc.) that can be configured to perform aspects of the various inventive concepts described herein.

Aspects of the present disclosure relate generally to electronic devices, and more particularly to computer peripheral devices that utilize a hybrid switch implementation for improved performance characteristics, according to certain embodiments.

In the following description, various examples of devices utilizing hybrid switch technologies are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high level summary is intended to provide a basic understanding of some of the novel innovations depicted in the figures and presented in the corresponding descriptions provided below. Aspects of the invention relate to various improved computer peripheral devices and electronic devices more generally (also referred to as input devices) that incorporate hybrid switches, as described in the embodiments that follow. An input device, as noted above, is typically used to convert human-induced analog inputs (e.g., touches, clicks, motions, touch gestures, button presses, scroll wheel rotations, etc.) made in conjunction with the input device into digital signals for computer processing. A button (e.g., used in a computer mouse, remote control, game controller, etc.) or key (e.g., used on a keyboard) are common depressible elements that can be depressed by a user to instantiate a type of control signal (e.g., an alphanumeric character, a left/right mouse button, a trigger, etc.). For a button, in many contemporary computer mice, the button "click" detection is typically based on a type of contact-based switch, such as a galvanic or electric switch, where a physical contact between two elements causes the input device to generate a control signal (e.g., a button click). These types of switches have been used for many decades and, through continued innovation, have seen improvements in longevity, reliability, and price. However, contact-based switches (see, e.g., FIG. 4A) are still susceptible to inevitable wear-and-tear as the contacts mechanically or chemically wear out, resulting in poor quality, noisy signals (see, e.g., FIGS. 4B-4C). Some contemporary input devices have incorporated contactless switches (e.g., optical switches—see, e.g., FIGS. 5A-5B). Although these types of switches provide better reliability and longevity as compared to contact-based switches, they can consume significantly more current (e.g., 5-6 mA) even when not being operated (depressed). While there have been improvements in their operating efficiency, contactless switches, and particularly optical switches, regularly consume significantly more power than basic contact-based switches, which consume comparatively negligible current, and particularly when not activated (e.g., not making contact).

Certain implementations are directed to a hybrid adaptation of two (or more) switches (see, e.g., FIG. 6) to achieve improved performance, power efficiency, reliability, longevity, and more. In some aspects, the contact-based switch can be used (1) to notify the system of typing activity; and (2) while the input device is in an inactive or low power mode. The contact-based switch can be used to "wake" the input device (e.g., change modes from a low power "sleep" or "inactive" mode to a high power "active" mode) with negligible battery consumption. When the contacts of the contact-based switch inevitably begins to wear out it will still generate a signal, but with deleterious effects (see, e.g., FIG. 4C). However, because the signal is only used to wake the input device, the noisy signal can reliably be used for that purpose. The contactless switch (e.g., optical switch) can be used in the high power mode, thus the input device benefits from the lower power characteristics of the contact-based switch when in low power mode, and only uses the contactless switch (e.g., optical switch) and its higher power requirement when in an active mode. The hybrid combination of the two switches presents many additional advantages and smart functionality. While many of the embodiments presented herein are directed to a keyboard button, the novel concepts provided herein can be applied to any input device.

One logistical challenge for some of the aforementioned embodiments is the need to be able to address both the first and second key switch types for each key structure over an entire keyboard, which may require double the amount of send/receive ("scan") lines than would be needed in conventional keyboards with a single key switch per key structure. This can prove costly from a materials standpoint, and can further limit PCB space for lighting elements (e.g., LEDs). Novel aspects of the invention relieve this problem by grouping the first type of key switches into addressed subarrays (e.g., galvanic nets) rather than addressing individual first key switches so that fewer send/receive lines are needed to determine which subarray(s) produces a first signal (e.g., a signal from the first-type of key switch that is indicative of a key press event corresponding to a user pressing the key). That is, some embodiments use groups of contact-based first key switch types to inform a processor (e.g., on-board, off-board) that a key press event has occurred (e.g., a user presses a key) in one of the subarrays that contain the key structure that produced the key press event. Note that a key press event causes both the first-type and second-type key switch to be simultaneously or contemporaneously be produce corresponding first and second signals, as described above. The subarray that is the source of the detected first signal can then be subsequently scanned to detect the second signal from the corresponding key structure being pressed by the user.

In certain embodiments, the key structures are configured in an array and divided into subarrays forming a plurality of rows and columns. In some cases, as shown in the figures that follow, each column of key structures and corresponding first key switch types correspond to a single subarray so that one send/receive line is used for each column of key structures (e.g., column of four or five key structures) rather than having send/receive lines for each key structure, as is used in conventional embodiments and described above. By way of example, keyboard key structures (keys) may be configured in subarrays corresponding to vertical columns. When the 'e' key is pressed, its first key switch type generates a first signal. The 'e' key may correspond to the vertical column of keys comprising alphanumeric keys "3,e,d,c" in a typical "Qwerty" type keyboard. Note that any grouping of keys including the number of keys, the arrangement of keys (e.g., row, column, section, type), etc., can constitute a subarray. Once the key press is detected in the "3,e,d,c" subarray, the processor(s) proceeds with determining which key structure produced the first signal by scanning for the second signal in that particular subarray. In some aspects, the second signal scanning can individually scan each key structure in the particular subarray (and across all subarrays). Once detected, a key press event for the key structure producing the second signal can be instantiated by the processor to a host computing device.

The novel embodiments described herein present many technical advantages of conventional designs. In addition to the cost savings of utilizing fewer traces to address (send/receive or "scan") each of the first key switch types, substantial power savings are possible because very little power is consumed when no keys are pressed and when scanning for first signals from first key switch types, and non-negligible power is typically only consumed when scanning the second key switch types, as further described below. Furthermore, key press latency is improved because key switch scanning can be performed close to report out intervals so the time between a scan and corresponding report can be reduced.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 shows a user 105 operating a host computing device (shown as a desktop computer) 110 and a number of computer peripheral devices that can be coupled to and/or integrated with the host computing device, including a display device 120, a computer mouse 130, a keyboard 140, and may include any other suitable computer peripheral device (e.g., microphone, speaker(s), docking station, headphones, etc.). Each computer peripheral device 120-140 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one or more of the host computing devices (e.g., a computer mouse may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a computer mouse) and not shown (e.g., remote control, wearables (e.g., gloves, watch, head mounted display), AR/VR controller, CAD controller, joystick, simulation shifter, stylus device, or other suitable device that can be used, for example, to convert analog inputs into digital signals for computer processing. By way of example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art. The buttons of computer mouse 130 and the keys of keyboard 140 (or other depressible element on any input device) may incorporate hybrid switch architectures, as presented herein.

An input device may be a computer peripheral device, and may be referred to as either herein, as well as a "peripheral input device," "peripheral," or the like. The majority of the embodiments described herein generally refer to computer peripheral device 140, however it should be understood that a computer peripheral device can be any suitable input/output (I/O) device (e.g., user interface device, control device, input unit, or the like) that may be adapted to utilize the novel embodiments described and contemplated herein.

A System for Operating a Computer Peripheral Device

Figure 2:
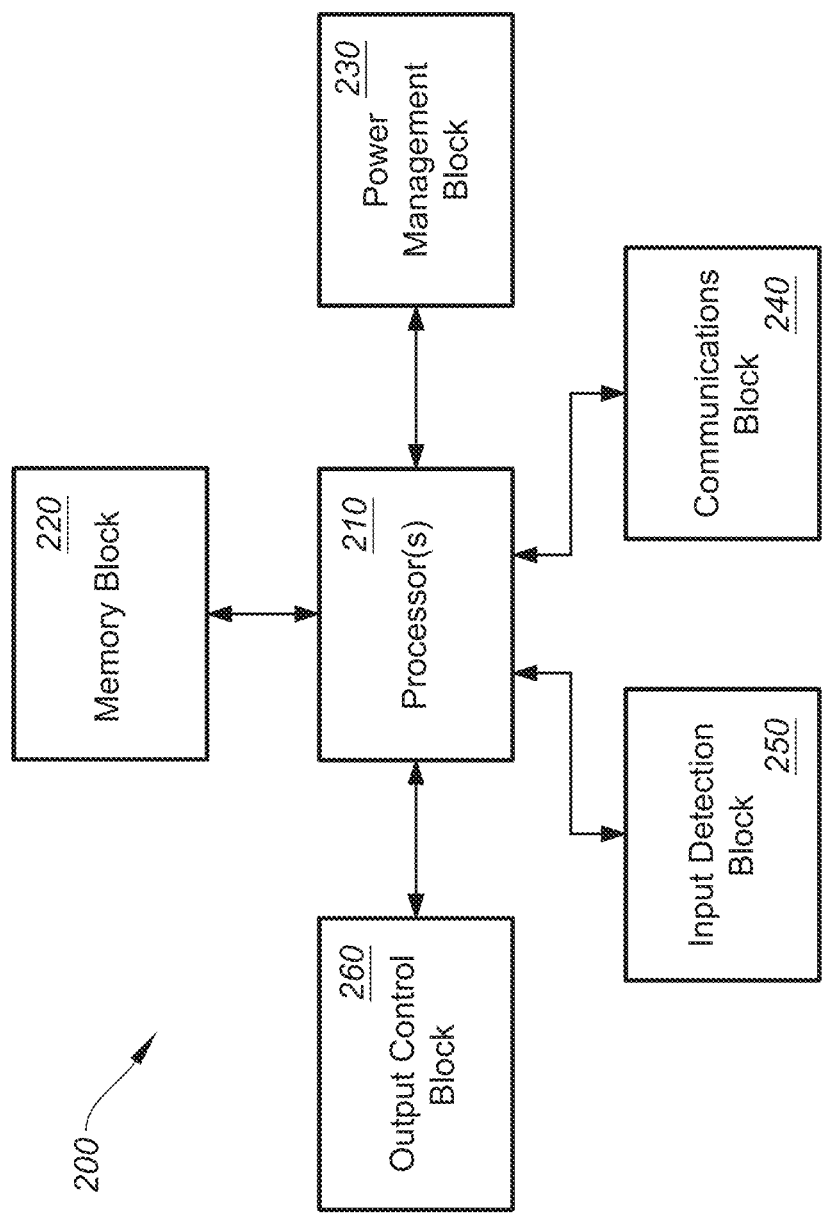
FIG. 2 shows a simplified block diagram of a system configured for operating an input device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices specifically shown or not shown herein but within the wide purview of the present disclosure. System 200 may include processor(s) 210, memory block 220, a power management block 230, a communications block 240, an input detection block 250, and an output control block 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules," "systems," or "system blocks") may be implemented as separate modules, or alternatively, more than one system block may be implemented in a single module. In the context described herein, system 200 can be incorporated into any computer peripheral device described or mentioned herein and may be further configured with any of the hybrid switch implementations presented herein, as described below at least with respect to FIGS. 8-11, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 140 (e.g., system block 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., method 1100) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory 220 can store the various data described throughout this disclosure. For example, memory 220 can store and/or include instructions configured to perform the various hybrid switch controlling schemas presented herein, such as method 1100. Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute to run various operations (e.g., software-controlled switches, etc.) as described herein.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), a corded power supply, or other suitable power source. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, input device 130 can be configured to receive a USB, Fire Wire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from keys or buttons (e.g., depressible elements), roller wheels, motion sensors, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.) image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser-based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection block 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
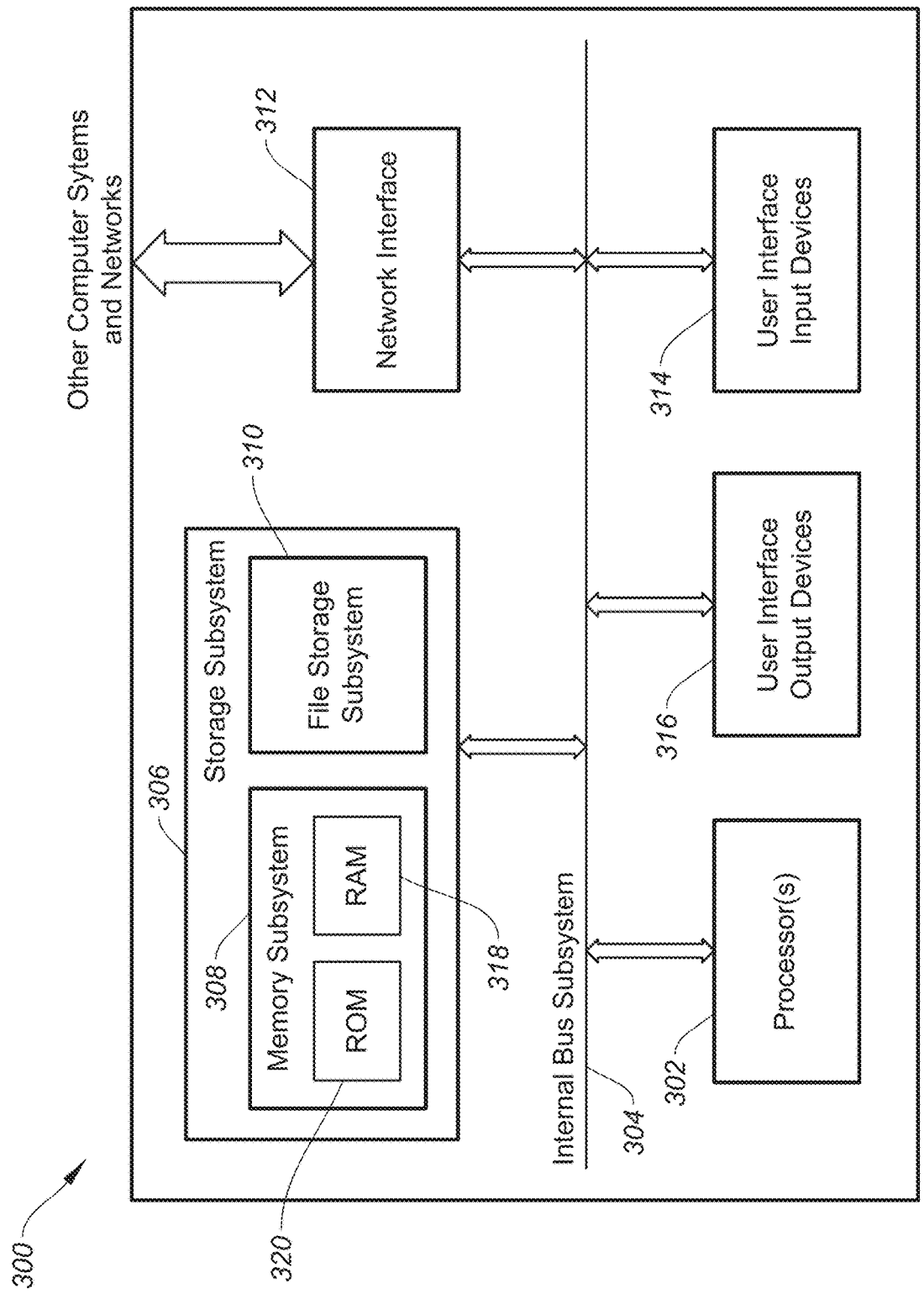
FIG. 3 shows a simplified block diagram of a system for operating a host computing device, according to certain embodiments.

FIG. 3 is a simplified block diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), gaming console, wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Contact-Based Switches

In the present computer peripheral market (e.g., keyboard devices), button press detection (e.g., detecting when a depressible element such as a keyboard key or button is depressed) is primarily based on contact-based switches (e.g., galvanic/electric), where a physical contact between two elements causes the input device to generate a control signal. Contact-based switches typically utilize galvanic isolation, which involves isolating functional sections of electrical systems to prevent current flow such that no direct conduction path is possible. In other words, when the physical switch is closed, electric current flows and a signal is typically generated such as a button press signal or other suitable human interface device (HID) signal, as would be appreciated by one of ordinary skill in the art with the benefit of this disclosure. When the switch is open, no electric current flows and typically no HID signal is generated. Contact-based switches have been in use for many decades and have been steadily improved for better longevity, reliability, and price over the years. Contact-based switches also have excellent power efficiency. While the switch is open (e.g., while the button is at rest and is not being depressed or activated), there is effectively no current flow and practically zero power dissipation (e.g., ignoring negligible micro-amp range leakage currents, etc.). While the switch is closed, which is typically at millisecond range durations, the operating current and corresponding power dissipation is still relatively very low (e.g., 100-400 µA or the like). Despite the excellent power dissipation characteristics, contact-based switches are subject to repeated mechanical impact and after some time the contacts mechanically or chemically wear out resulting in noisy data that may be unreliable or unusable, which can render the corresponding input device at least partially inoperable and unfit for its intended use. According to certain embodiments, a hybrid switch approach (see, e.g., FIG. 6) can present a superior depressible element structure that incorporates aspects of a contact-based switch with a second switch (e.g., a contactless switch, such as an optical switch) that takes advantage of the excellent power dissipation characteristics of the contact-based switch, while mitigating its weakness in longevity, as further described below at least with respect to FIG. 6. As further described below, contact-based switches are typically presented as a "first-type of key switch" that generates a first signal, and contactless switches are typically presented as a "second-type of key switch" that generates a second signal.

Figure 4A:
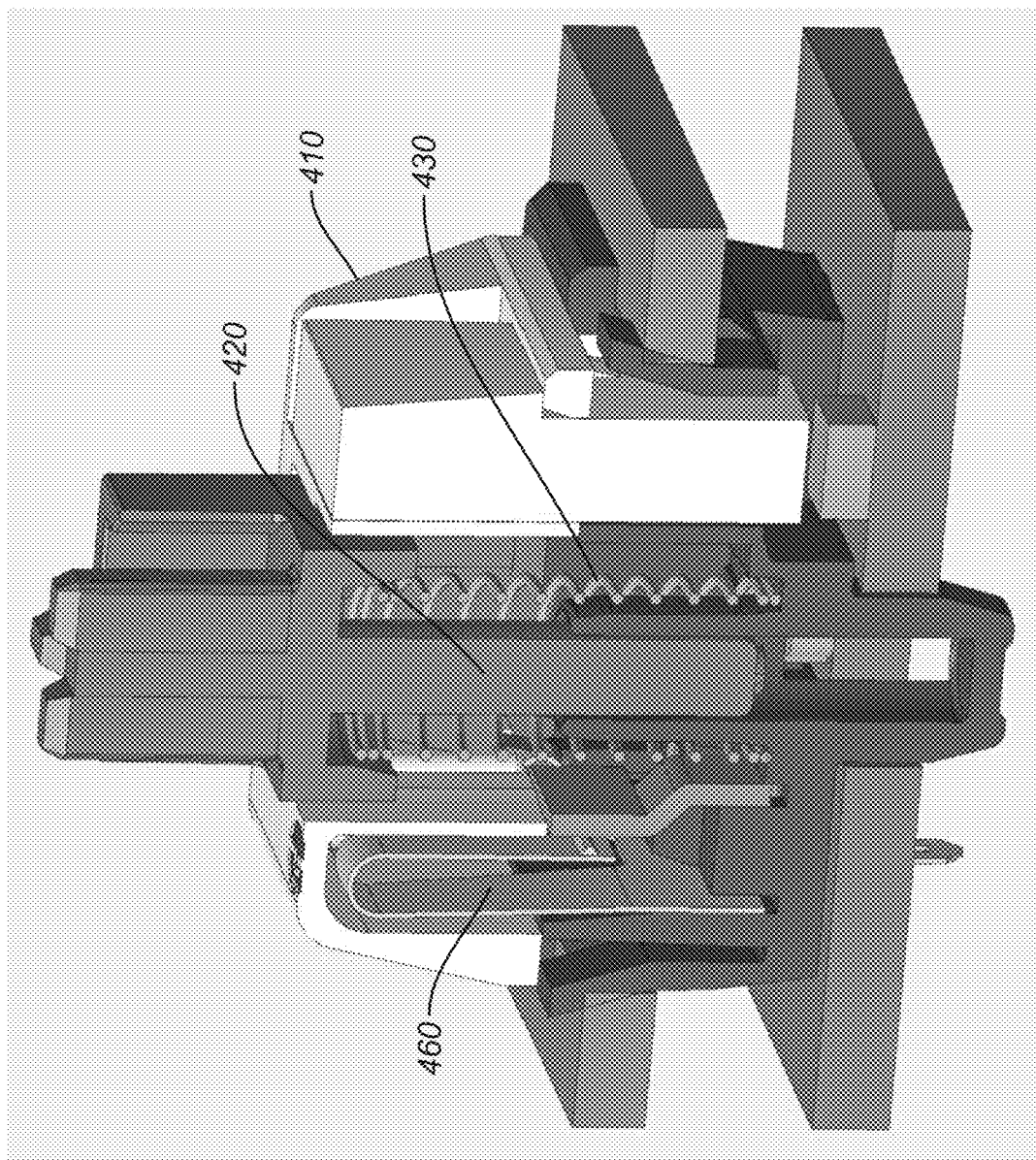
FIG. 4A shows a cross-section of an example of a contact-based switch for an input device.

FIG. 4A shows a cross-section of a simplified example of a contact-based switch 400 for an input device. Contact-based switch 400 can include a housing 410, actuator 420, a biasing mechanism 430, terminal section and contact (not fully shown), and feedback profile biasing mechanism 460. Housing 410 is configured to contain and protect the internal mechanisms of switch 400 providing electrical insulation and mechanical integrity. Housing 410 may be a self-contained subassembly of an input device (e.g., keyboard), although some embodiments may employ multiple switches in a shared housing, such as the type used in hybrid switch 600, as further described below with respect to FIG. 6.

Actuator 420 can be configured to transfer a movement and external imparted force to the internal mechanism of switch 400. For example, a user may press actuator 420 directly or indirectly (e.g., via a button, key cap, etc., coupled to actuator 420) to cause actuator 420 to move according to a linear translational path and impart a force onto biasing mechanism 430. In some aspects, the depressible element can be the key or button in combination with actuator 420, as would be appreciated by one of ordinary skill in the art with the benefit of this disclosure. Actuator 420 may be comprised of multiple elements, including user interface elements (e.g., mouse button, key cap, etc.) and internal elements to better transfer force to internal components. Any suitable shape or number of elements can be used as would be appreciated by one of ordinary skill in the art with the benefit of this disclosure.

Biasing mechanism 430 can provide a restoring force to return the key to its original non-pressed position. Actuator 420 typically imparts a user-induced force (e.g., from a button or key press) causing the terminal section and contact to move from a first position—an open circuit condition, to a second position—a closed circuit condition where electrical contact is made. In some cases, the first position may correspond to the depressible element (e.g., actuator 420 and corresponding elements) being non-pressed to a particular position or within a range of positions such that contact 450 does not make electrical contact, and the second position may correspond to the depressible element being depressed enough to make electrical contact. Biasing mechanism 460 may be configured to provide the feedback profile by providing a "click" or other suitable feedback (e.g., increasing feedback followed by release) to provide a suitable tactile feedback experience for the user. FIG. 4A provides one simplified embodiment of a contact-based switch and one of ordinary skill in the art with the benefit of this disclosure would appreciate the many modifications, variations, and alternative embodiments thereof.

Figure 4B:
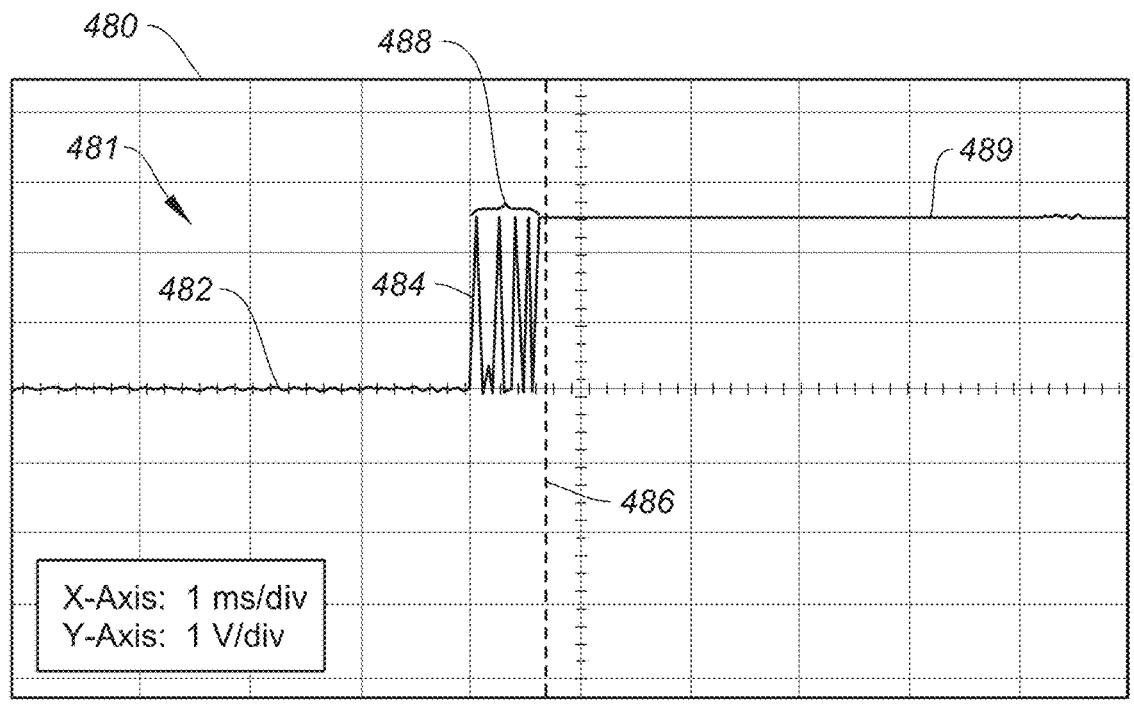
FIG. 4B is a signal diagram showing an example of a typical signal corresponding to a click event by a properly functioning contact-based switch.

FIG. 4B is a signal diagram 480 showing an example of a typical signal 481 corresponding to a click event by a properly functioning contact-based switch. Signal 481 switches from low voltage (e.g., electrical ground) 482 to a higher voltage (e.g., rail voltage) 489 when contact 450 makes electrical contact with terminal B. A typical contact-based switch in good condition (e.g., no considerable wear-and-tear) literally bounces briefly when contact is made, which typically last about 2-5 us micro/milliseconds, and manifests in the signal as a signal ripple 488. This occurs during normal operation and typically does not affect the ability to decipher button inputs, however debouncing algorithms to interpret and account of bouncing may add some latency to detection (e.g., 1 ms or more). A clean, fully transitioned signal 489 occurs after the bouncing decays at threshold 486 (e.g., typically 2 V, 3.3 V, or the like). With a "good" contact, the bouncing may last approximately 0.7 ms and typically less than 1-2 ms, although other durations are possible. A typical click from a user may be as short as 30 ms, thus 1 ms bouncing is often inconsequential when trying to ascertain the intended input (e.g., single click, double click, etc.).

Figure 4C:
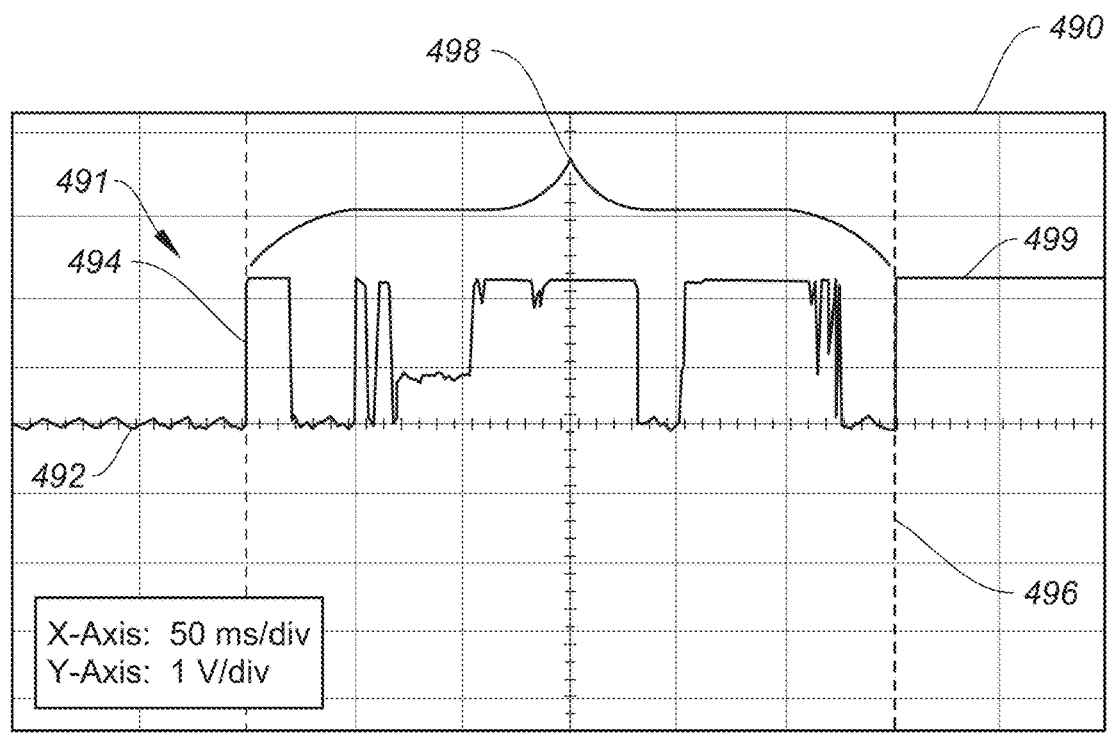
FIG. 4C is a signal diagram showing an example of a possible signal corresponding to a click event by an improperly functioning contact-based switch.

FIG. 4C shows an example of a possible signal corresponding to a click event by an improperly functioning contact-based switch. As can be seen in FIG. 4C, signal 491 is noisy and does not show a clean transition between a low and high voltage in response to the depressible element being pressed and causing contact 450 to make contact with terminal B. Signal 491 transition from a low voltage 492 to a relatively long period of signal noise 498 until a solid high voltage signal 499 is recognized at threshold 496. It is unclear whether the noise includes ripple, if a double press occurred, etc., and an unreliable output may result. The deleterious noise occurs for approximately 300 ms. Since a typical user click may take approximately 30 ms, it can be plainly seen how interpreting a user input (e.g., click, double click, click-and-hold, etc.) can be misinterpreted, and in some cases the noise may not actually be related to a user input at all. FIG. 4C is indicative of some contact-based switches with substantial wear-and-tear on the contact and/or the corresponding terminals, which can limit the operational life of the input device, as noted above. It should be noted that the various durations presented herein are provided for context and other durations are possible, as would be appreciated by one of ordinary skill in the art with the benefit of this disclosure. Furthermore, FIGS. 4B-4C shows a normally low signal (e.g., 0 V with no key press) that goes high (e.g., 2.5 V) when a mechanical contact is made, and back down when contact is released. Some embodiments may be configured with a normally high signal that goes low when a mechanical contact is made, and goes back to a high signal when released. One of ordinary skill in the art with the benefit of this disclosure would appreciate the many modifications, variations, and alternative embodiments thereof.

Contactless Switches

In light of the longevity and reliability problems typically associated with contact-based switches, some contemporary manufacturers have changed to contactless switches. A contactless switch typically does not have mechanically interfacing elements (no contacts) during operation and can have a substantially longer operational life since there are no critical components subject to wear-and-tear. Thus, contactless switches can provide very clean signals (e.g., no bouncing, intermittent contacting, etc.) to allow the input device to have a longer operational life. Some non-limiting examples of contactless switches include optical switches (described in embodiments herein), magnetic switches, inductive switches, capacitive switches, piezo switches, and the like. In addition, because contactless switches do not involve a physical contact between elements, no additional latency is needed to apply debouncing algorithms, and the like. Despite these advantages, contactless switches (e.g., optical switches) can consume significantly more current than a contact-based switch as they have to be actively scanned (e.g., continuously or periodically) to confirm whether the switch is open or closed.

FIG. 5A shows an example of an operation of an optical switch sensor 500 with a default-open configuration, according to certain embodiments. Optical switch sensor ("optical switch") 500 can include an emitter 520, a receiver 530, and a barrier 510 that is typically directly or indirectly coupled to an actuator (e.g., similar to actuator 420) to move up and down in correspondence with the movements of the depressible element. Barrier 510 can also be referred to as a "shutter." Typically, barrier 510 can move from a first position that does not obstruct a line-of-sight between emitter 520 and receiver 530 and a second position that obstructs the line-of-sight. Barrier 510 may provide an analog-like operation by allowing a user to adjust a position of barrier 510 by modulating an amount of obstruction that can range from complete obstruction, to some obstruction, to no obstruction. In operation, emitter 520 typically includes a light emitting diode (LED) that is pulsed (e.g., 2-50 μs) at an LED current (e.g., 2-10 mA) and a fixed frequency (e.g., 1 ms), which is typical in contemporary high-end gaming peripherals (e.g., computer mice and keyboards). The light 525 is projected from emitter 520 towards receiver 530, which can be a phototransistor or other light-sensing element. The amount of current generated by receiver 530 can correspond to an amount of light 525 received from emitter 520. Unlike contact-based switches, which typically have a binary output including an "on" (closed circuit) or "off" (open circuit) operation, contactless switches may allow no light, some light, or all light emitted from emitter 520 to reach receiver 530, thus allowing any number of intermediary settings and can allow a user to set an "on" condition to any suitable actuation threshold (e.g., corresponding output from receiver 530), which can correspond to how far a button or key needs to be pressed to instantiate a key press. Optical switch 500 is in a normally open configuration where the switch allows light 525 emitted from emitter 520 to reach receiver 530 unobstructed when the actuator that controls barrier 510 is not pressed, and blocks the light 525 from emitter 520 when the actuator is depressed.

FIG. 5B shows a switch 550 with a normally-closed configuration where the switch blocks light 575 emitted from emitter 570 to reach receiver 580 when the actuator that controls barrier 560 is not pressed, and allows the light 575 from emitter 570 to reach receiver 580 when the actuator is depressed. In either configuration, despite the advantages of having a clean signal (e.g., no bouncing or corresponding latency to debounce), an ability to set an actuation threshold, and substantially improved longevity over contact-based switches, contactless switches may utilize power at all times, even when the depressible element is not pressed in order to detect when the state of the button in an acceptably fast time (e.g., within 1 ms), and thus utilizes substantially more power than contact-based switches. In certain embodiments, hybrid switch topologies mitigate this problem by only scanning the contactless switches (e.g., second type of key switch) when a subarray reports a first signal, as further described below.

Hybrid Switches

Aspects of the invention use a hybrid switch design (e.g., hybrid switch 600) that utilizes both a contact-based switch and a contactless switch to create an improved switch design that gains the benefits of both types of switches and mitigates their drawbacks. In some embodiments, the contact-based switch may be used when the input device is in a low power mode to take advantage of its low power consumption characteristics, as described above. As noted above, the contact-based switches can be grouped into subarrays. A contact-based switch can generate a first signal when pressed, which will trigger the system to scan the corresponding subarray for a second signal (from the contactless switch) to identify the key structure being pressed, as described above. Thus, negligible power is consumed until the system scans a subarray to determine the source (depressed key structure) of the second signal. In some aspects, a leading edge 484 of a signal 481 (or another portion thereof) can be used to represent a first signal. Even when the contact-based switch begins to fail and produces noisy and potentially undecipherable signals as a user input (e.g., click, double click, click-and-hold, etc.), as shown in signal 491, the rising edge 494 may be used simply as a binary trigger to cause the input device to register a first signal. Thus, any amount of noise can be present on the signal as a result of a button press event and a faulty contact-based switch can still be reliably used to trigger a state change because a simple rising edge, though poorly rendered, can still be reliably generated. In some aspects, the system described above can operate such that the leading edge can be a falling edge as well, as would be appreciated by one of ordinary skill in the art with the benefit of this disclosure.

The contactless switch may also be used in the same hybrid switch architecture and may be configured to be activated when a key is pressed, which can take advantage of its excellent reactivity and reliability characteristics and avoid much of its higher power consumption drawbacks by keeping the contactless switch off until a first signal is detected in one of the subarrays.

Figure 6:
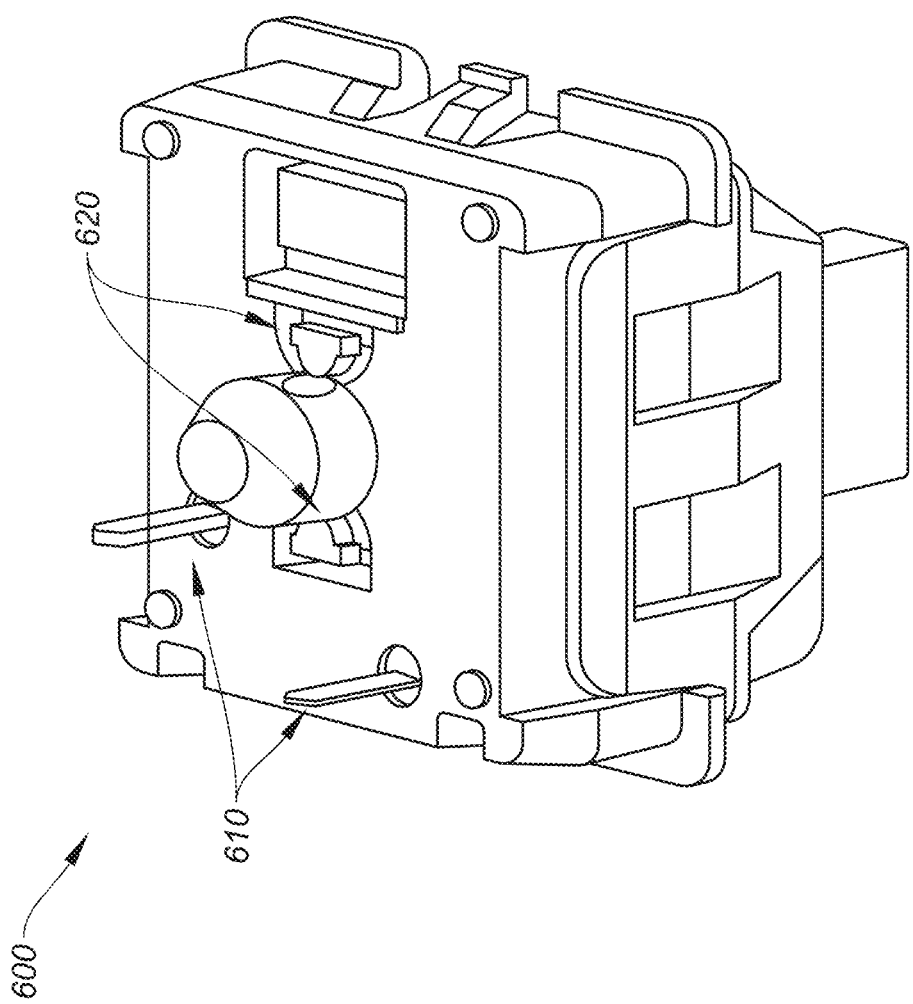
FIG. 6 shows an example of a key structure with a hybrid key switch architecture, according to certain embodiments.

FIG. 6 shows an example of a key structure 600 with a hybrid key switch architecture, according to certain embodiments. Key structure 600 can include mechanical pins 610 and contactless module 620. Mechanical pins 610 can each be coupled to separate electrical contacts that are operable to make and break contact to effectuate a key press event when the key structure is pressed, as described above. Contactless module 620 may incorporate optical sensing where an actuator is depressed by a user (via a depressible element) and a biasing mechanism is moved down to simultaneously cause the contact-based switch (first-type switch) to close to generate a first signal and cause an optical barrier of the contactless switch to block light from a photodiode to prevent it from reaching the photo-transistor, causing the contactless switch to generate a second signal. The key structure may have a form factor similar to other common keyboard key structures, such as MX Cherry® key switches, or other suitable form factors. As noted above, any suitable contact-based key switch (e.g., typically mechanical, galvanic, etc.) and contactless key switch (e.g., optical, magnetic, inductive, etc.) can be used in the hybrid key structure, as would be appreciated by one of ordinary skill in the art with the benefit of this disclosure. In some cases, the optical elements may be part of the main board, rather than integrated with the switch, as shown.

Figure 7:
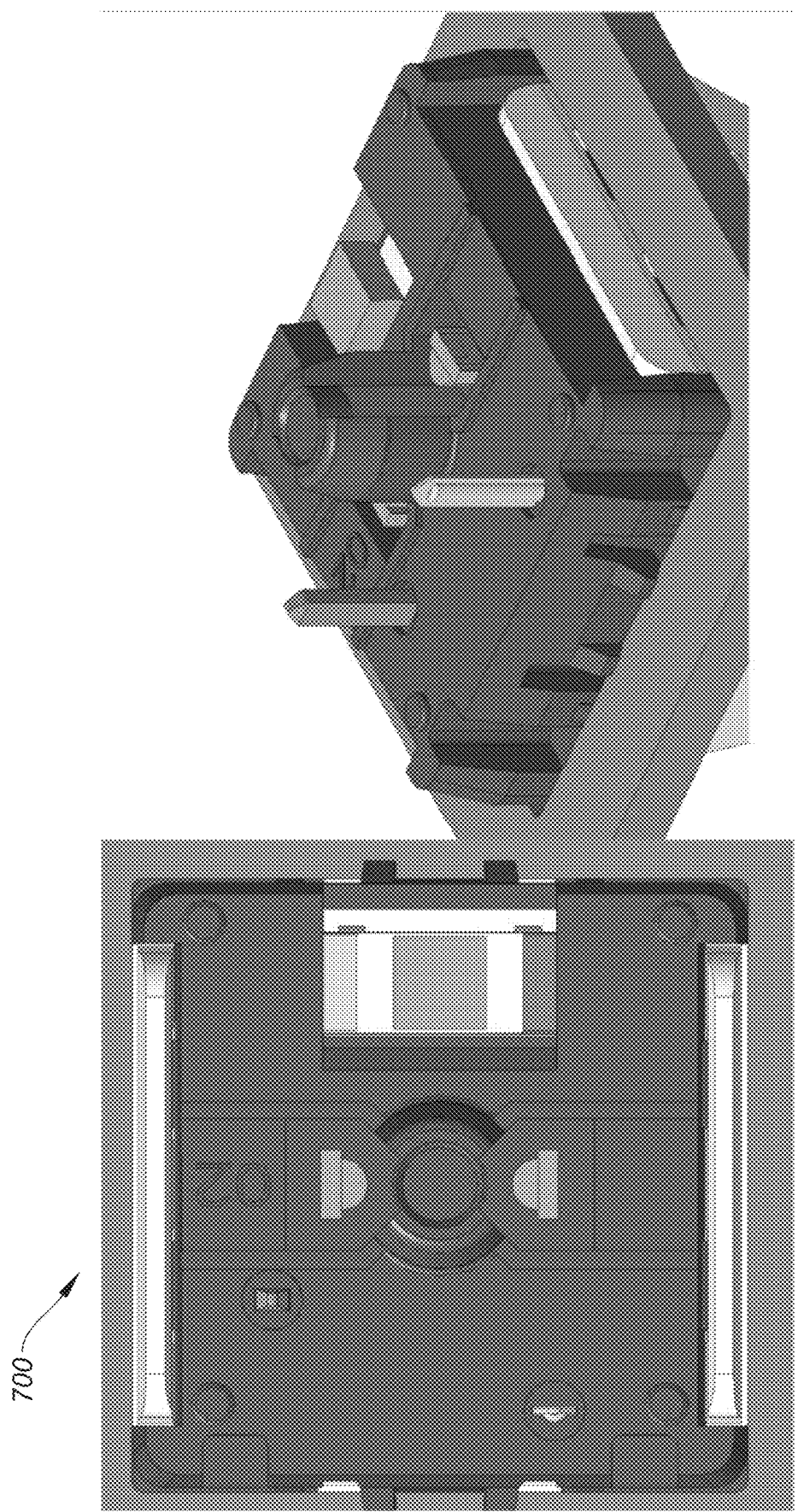
FIG. 7 shows a bottom-side view of a second example of a key structure with a hybrid key switch architecture, according to certain embodiments.

FIG. 7 shows a bottom-side view of a second example of a key structure 700 with a hybrid key switch architecture, according to certain embodiments. As shown, the optical elements (e.g., photodiode and photo-transistor) are configured on the key switch differently. In some cases, the optical elements may be separate from the key switch and mounted on a main board, integrated with the switch, or other suitable arrangement, as would be appreciated by one of ordinary skill in the art with the benefit of this disclosure. FIG. 8 shows a side cutaway view of the second example of the key structure 700 with a hybrid key switch architecture, according to certain embodiments.

Scanning Method for Keyboard Matrices with Hybrid Switches

Aspects of the invention are directed to an improved method of scanning a matrix of key structures using hybrid switches, according to certain embodiments. The hybrid switch pair is typically comprised of a mechanical contact-based switch (first-type switch) and a contactless switch (second-type switch). This method of high performance sensing can improve system performance, reliability, eliminates bounce, while the traditional mechanical contacts (first-type switch) can be utilized for reduced power while maintaining a good UX key feeling for the user.

When a large amount of keys need to be scanned by an MCU (e.g., with limited IOs), it is common to put those keys in a matrix arrangement, e.g., N driving columns×M reading rows. In the case of hybrid key structures, the "high performance sensing" of the second-type switch is typically put in a matrix arrangement of columns (drive) and rows (read). However, according to certain embodiments, the contact-based sensing (first-type switch) is not put in another matrix arrangement, but is connected together forming different clusters called galvanic nets ("mechanical galvanic nets" or "subarrays"). A novel aspect is that by default the MCU does not scan the "high performance sensing" matrix until after receiving an interrupt on the subarray (galvanic cluster) that is advertising (e.g., via the first signal generated by the first-type switch) the MCU that a typing activity (e.g., key press event) is ongoing. In some embodiments, the high performance sensing is matrixed and the MCU may be operable to enable the power column by column, thereby providing for improved methods of clustering the subarrays for better power consumption and latency performance. One method is to group the key structures that are on the same column to form a single mechanical galvanic net. When a key press event is detected on this column, the MCU only has to enable power to scan this active column. This can be referred to as "partial scanning" since only the active columns of second-type key switches need to be scanned.

At a high level, partial scanning can be summarized as follows: (1) by default the high performance sensing (e.g., contactless, second-type key switch) is disabled; (2) when an interrupt is detected on a subarray (e.g., first signal indicating a depressed contact-based key switch within a galvanic net), the high performance sensing is triggered and enabled for this galvanic net only (e.g., MCU scans this subarray for a second signal generated by the second-type key switch (e.g., optical sensor)) to register a key press event; and (3) disable the high performance sensing when all keys are released (or after a threshold period of time). As noted above, some technical advantages of partial scanning include lower power consumption and faster scanning with lower latency. With respect to reduced power consumption, partial scanning only consumes power when there is a typing activity (key press event(s)) and negligible power (e.g., leakage currents <50 µA) with respect to scanning for key presses is used otherwise. In some aspects, sleep and deep sleep modes (e.g., low power modes) can be triggered for wake-up (e.g., active modes) in response to receiving the first signal, which does not require high performance scanning. Furthermore, only the column(s) (e.g., subarrays) that have key press events need to be powered for scanning. Thus, not all subarrays require scanning, as compared to conventional designs, which scan all columns. Thus, by using one galvanic net per drive column, it can directly advertise the MCU which exact column(s) is having an activity and thus we only need to scan this specific column to register the key structure(s). As noted above, although it may be optimal to have subarrays correspond to physical columns of keys, any grouping of key structures are possible including columns, rows, or any suitable arrangement (e.g., linear, non-linear, continuous, non-continuous, etc.), or the like. One of ordinary skill in the art with the benefit of this disclosure would appreciate the many modifications, variations, and alternative embodiments thereof.

With respect to faster scanning and low latency, because only active columns need to be scanned, registering a key press event is faster (e.g., partial scanning leads to fewer columns to scan) and the partial scan can be configured to occur just before generating the periodic RF report or USB report so that the key press event latency is minimized on average.

Figure 9:
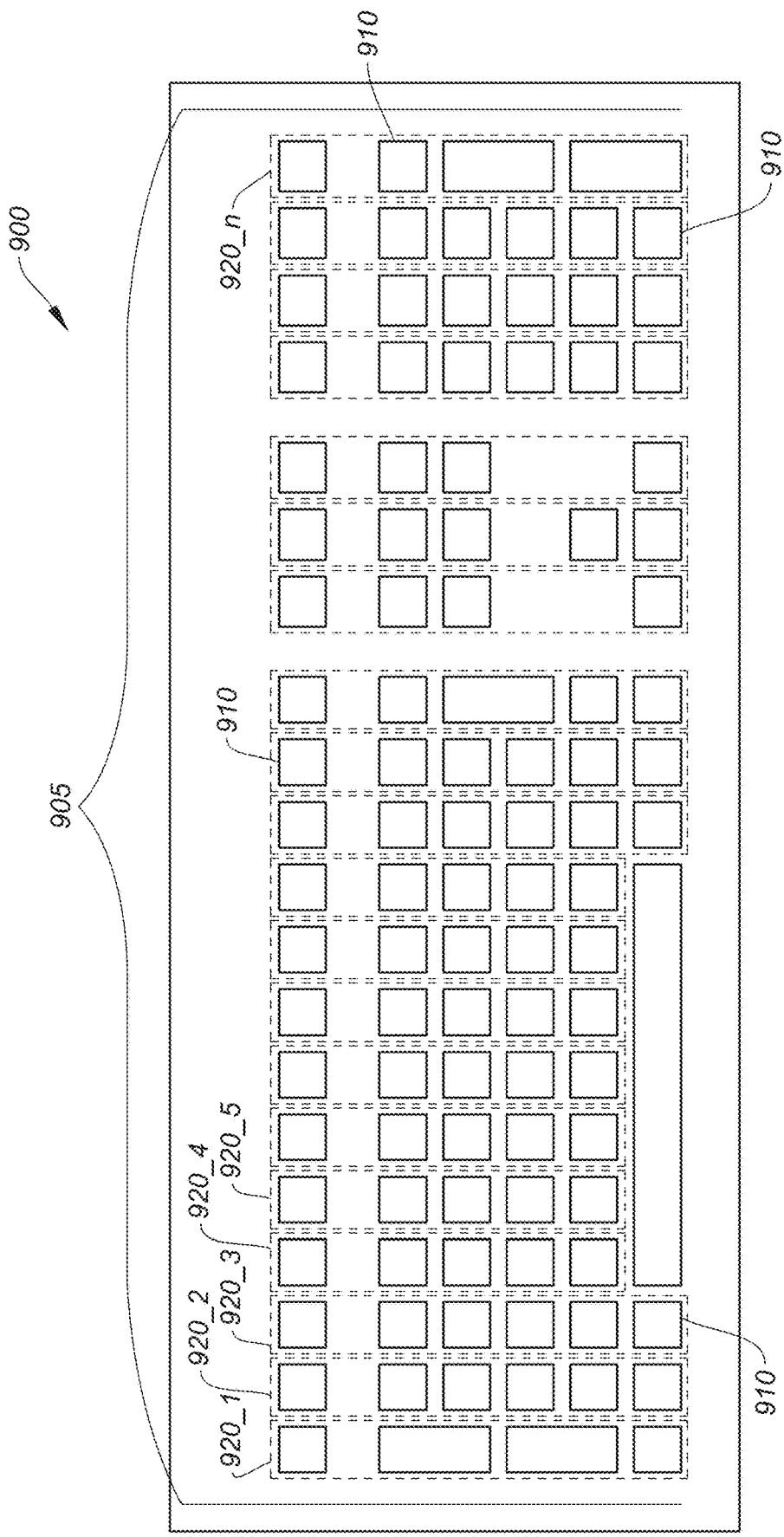
FIG. 9 shows a keyboard device with a key matrix having column-based subarrays, according to certain embodiments.

FIG. 9 shows a keyboard device with a key matrix having column-based subarrays, according to certain embodiments. Keyboard 900 may be operated by system 200 or the like. Keyboard 900 can comprise an array of key structures 905 including a plurality of hybrid key structures 910 disposed within the keyboard. Each hybrid key structure may include a first type of key switch and a second type of key switch the produce first and second signals, respectively, as discussed throughout this disclosure. In some embodiments, the array of key structure 905 can be grouped into a plurality of subarrays 920_1 through 920_n that each comprise a plurality of hybrid key structures. For example, subarray 920_1 may include 4 key structures, and subarray 920_2 can include 6 key structures. When a first signal is detected, the system identifies the active subarray(s) that produced it, and the system scans that subarray(s) for one or more second signals to determine a key press event, as further described below. Although some preferred embodiments may configure each subarray as a single column of hybrid key structures, it should be understood that any grouping of hybrid key structures is possible for a subarray, which may be linear or non-linear groupings, continuous or non-continuous groupings, different sized subarrays, or any suitable arrangement of hybrid key structures-typically configured to enable partial scanning for lower power consumption and, in some aspects, lower latency in reporting, as would be appreciated by one of ordinary skill in the art with the benefit of this disclosure.

Figure 10:
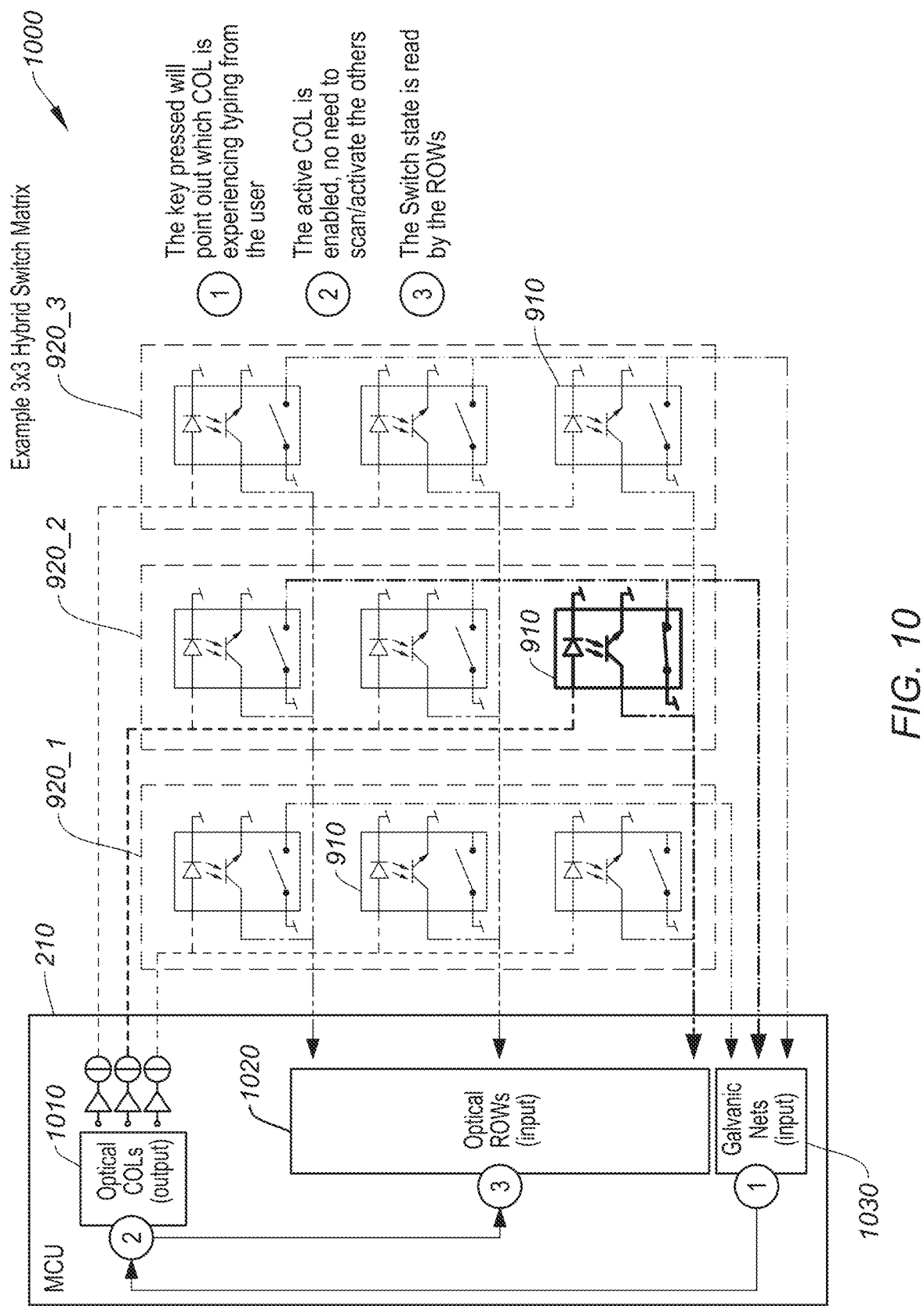
FIG. 10 shows an example of a 3×3 hybrid switch matrix, according to certain embodiments.

FIG. 10 shows an example of a 3×3 hybrid switch matrix 1000, according to certain embodiments. Keyboard 900 is referenced for illustrative purposes only and any arrangement of key structures may be possible that still incorporate the partial scanning concepts presented herein. Matrix 1000 can include processor 210 (identified as MCU), optical columns (output) 1010, optical rows (input) 1020, and galvanic nets (input) 1030. Each subarray 920_1, 920_2, 920_3 includes a number of hybrid key structures 910, as described above with respect to FIG. 9. Optical columns (COLs) 1010 includes a plurality of outputs-typically one output per column to send (drive) an optical element (e.g., normally open or normally closed). Optical rows 1020 read (receive, input) the corresponding optical elements for a closed circuit. Galvanic net 1030 can be configured to detect when any of the group of galvanic elements (first type of key switch) is closed within a subarrays (column). As noted above, embodiments of the present invention use this system to determine which column includes a closed first type of key switch.

In operation, at step 1 a user presses one of the key structures in subarray 920_2 of the array of keys, which is shown as a highlighted hybrid key structure in FIG. 10. This closes both the first type and second type of key switch. The closed first type of key switch generates a first signal, which is detected by galvanic nets input 1030 and provides an indication to the MCU that a key press event is occurring in subarray 920_2. This active subarray (e.g., column) is enabled and this particular subarray 920_2 is now scanned by the optical detection systems 1010 and 1020 and the optical switch state of the highlighted hybrid key switch is determined, resulting in a detected key press event. Note that since only subarray 920_2 produced a first signal, none of the other subarrays are scanned by the optical system, resulting in a faster scan rate using less power and potentially lower reporting latency, as described throughout this disclosure.

By way of example, if two keys were pressed in subarray 920_2, two first signals would be detected and, similar to the previous example, only subarray 920_2 would be scanned for optical signals (second signals)—in which case two second signals and two corresponding key press events would be detected. In another example, if two keys were pressed on adjacent subarrays (e.g., subarray 920_1 and 920_2), first signals would be detected via the galvanic net and the optical system would scan these subarrays for optical signals (second signals) resulting in two key press events. One of ordinary skill in the art with the benefit of this disclosure would appreciate the many modifications, variations, and alternative embodiments thereof.

Figure 11:
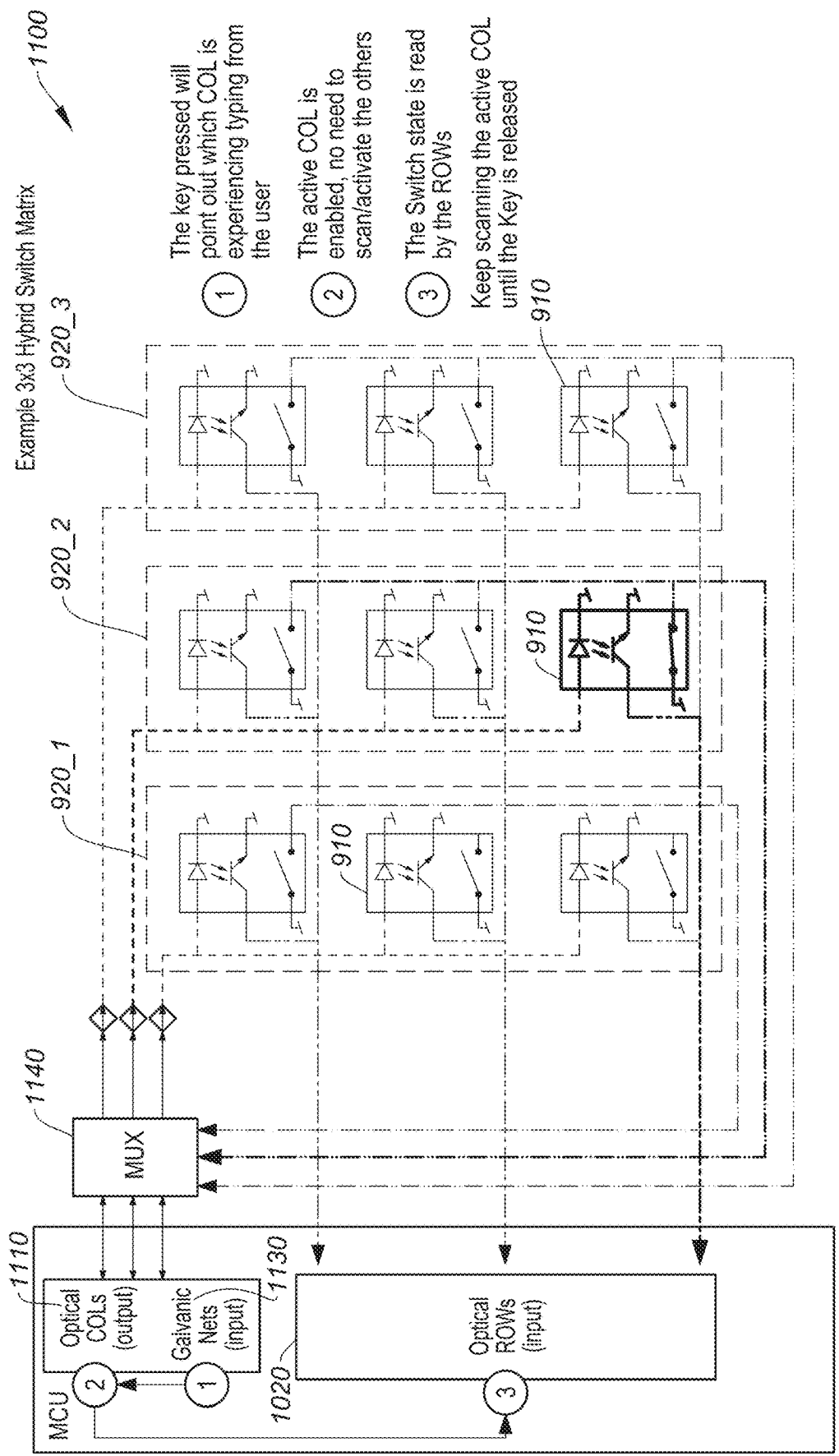
FIG. 11 shows an example of a 3×3 hybrid switch matrix using a multiplexor, according to certain embodiments.

FIG. 11 shows an example of a 3×3 hybrid switch matrix 1100 using a multiplexor, according to certain embodiments. Hybrid switch matrix 1100 is similar to the matrix 1000 of FIG. 10, except that the COLs and galvanic net are multiplexed together. By default, the IO is configured as an input and "listens" for galvanic net signals. When the active COL needs to be scanned with the optical elements, the COLs are configured as an output to be able to drive the respective active COL(s). Such embodiments do not change the overall concept presented in FIG. 10 much, but allows a reduction in I/O usage by multiplexing the COLs and galvanic net together and typically uses a few additional components (e.g., MOSFETs) in order to perform the multiplexing function, as would be appreciated by one of ordinary skill in the art with the benefit of this disclosure. For comparison, in an example matrix of 7×COLs×15×ROWs (105 addressable keys in total), the architecture of FIG. 10 (with a similar number of keys) may use 7 COLs+15 ROWs+7 Galvanic Nets, for a total of 29 IOs for the switches, where standard switches may only need 7×COLs and 15×ROWs, for a total 22 IOs. The multiplexing capability can further reduce the number of required IOs by sharing the same lines, thus eliminating or reducing the need for more IOs.

Figure 12:
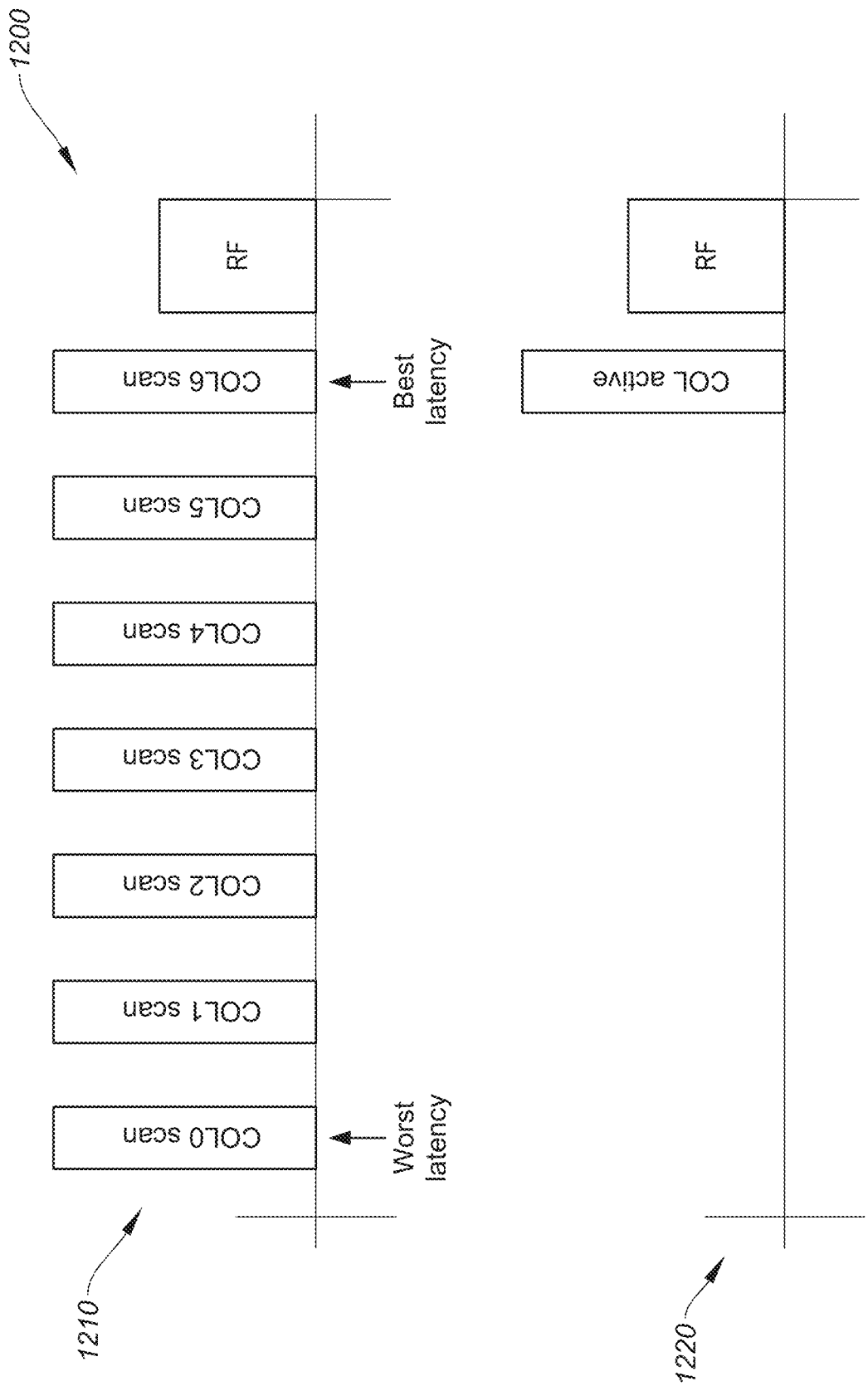
FIG. 12 shows an example of timing diagrams for a subarray scanning methodology, according to certain embodiments.

FIG. 12 shows an example of timing diagrams for a subarray scanning methodology 1200, according to certain embodiments. Timing diagram 1210 shows a subarray scanning methodology used in some conventional systems. In this arrangement, each column is scanned in a sequential fashion for optical signals regardless of whether any keys have been pressed. That is, conventional system may be configured to sequentially scan through rows and/or columns of keys to determine if any keys are pressed, and after each sequence is complete a report may be generated and sent to a communicatively coupled host computing device (e.g., via wireless (RF) or wired connection). As can be plainly observed, scanning all columns requires constant, near-constant, or frequent power consumption, which can be problematic for battery-driven products with limited power resources. Furthermore, any key press detections made early in the scanning sequence (e.g., in column 0) will be reported much later than key presses read later in the sequence (e.g., in column 6), which can result in different latencies for different keys, such that an "a" key (e.g., in column 1) in a typical QWERTY key arrangement will always have greater reporting latency (e.g., the time of an actual key press to the reporting) than an "h" key will have (e.g., in column 6), for the reasons given above.

Certain embodiments remedy this matter by reading active subarrays right before generation/submission of the next wireless report, as shown in timing diagram 1220. With partial scanning, only subarrays (e.g., columns) with detected first signals (e.g., galvanic signals) are scanned. To improve this latency issue, said subarrays with detected first signals may be scanned closer to the next wireless report. For example, if one column is reporting a first signal, then that column can be scanned for optical signals during a time where the latest column (e.g., column 6) is typically scanned in conventional sequential scanning systems, as shown in timing diagram 1220. If two columns with first signals are detected, then the scanning period may occur where the last two columns are typically scanned. Using this methodology (partial scanning), no power is necessarily consumed during times where no key press is detected and multiple key presses can be grouped so that optical scanning may only occurs during those key press events. For example, if a key press is detected in column 1 and column 6, the partial scanning system may opt to scan column 1 and 6 during the last two scanning periods (e.g., where col5 and col6 are shown in timing diagram 1210) instead scanning column 1 during the second sequential period and then again during the last sequential period. In this case, although similar power consumption may be present, better latency characteristics may be achieved.

To summarize, some exemplary embodiments may include a keyboard system comprising a plurality of hybrid key structures configured in an array, the array comprised of a plurality of subarrays, wherein each of the plurality of key structures in configured within any one of the plurality of subarrays and includes: a depressible element; a first type of key switch configured to generate a first signal when the depressible element is activated; and a second type of key switch configured to generate a second signal when the depressible element is activated; and one or more processors communicatively coupled to each of the plurality of hybrid key structures and configured to: receive the first signal from an activated hybrid key structure when its corresponding depressible element is activated; determine a corresponding subarray that the activated hybrid key structure is configured within; scan the corresponding subarray for a generated second signal; detect the generated second signal from the corresponding subarray; identify the activated hybrid key structure based on the detected, generated second signal; and register a key press for the identified activated hybrid key structure. The first type of key switch can be a contact-based key switch (e.g., galvanic mechanical key switch), and the second type of key switch can be a contactless key switch (e.g., optical key switch). In some cases, scanning the corresponding subarray includes driving the second type of key switch in each of the hybrid key structures in the corresponding subarray and reading their output for the generated second signal, as described above with the example in FIG. 10. In some aspects, scanning the corresponding subarray for detecting the corresponding second signal is performed in response to receiving the first signal (e.g., from the galvanic net). Typically, generating the first signal consumes negligible power (e.g., <100 µA, leakage current), and usually less than one tenth the power of generating the second signal. In certain embodiments, the keyboard system generates a radio frequency (RF) report with key press data that includes all identified activated hybrid key structures within a scan period comprised of a plurality of scan intervals, where the corresponding subarray (s) are scanned during scan intervals of the plurality of scan intervals that are closest in time to a generation of a next RF report. In some aspects, the array can include rows and columns, wherein each column includes a plurality of rows of hybrid key structures, wherein each column corresponds to one of the plurality of subarrays, and wherein each column corresponds to a different one of the plurality of subarrays than the remaining columns. It should be noted that rows and columns may or may not be linear arrangements of key structures. Some rows and columns may be curved, continuous or discontinuous, or any suitable plurality of key structures, as would be appreciated by one of ordinary skill in the art with the benefit of this disclosure. In some aspects, the one or more processors are disposed in the keyboard system (e.g., processor(s) 210).

Figure 13:
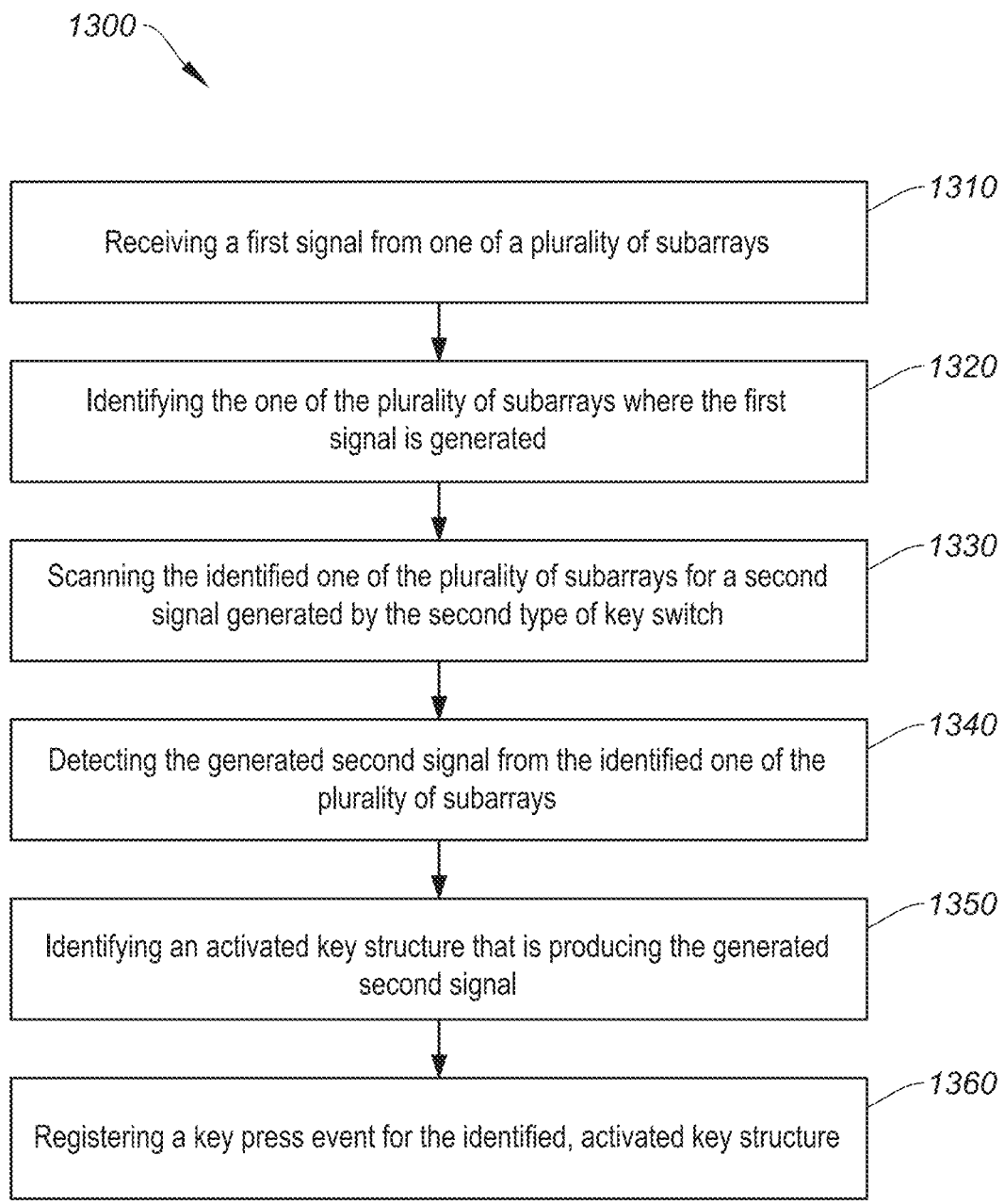
FIG. 13 is a simplified flow chart of a method of partially scanning a computer peripheral device (e.g., keyboard) for a key press event(s), according to certain embodiments.

FIG. 13 is a simplified flow chart of a method of partially scanning a computer peripheral device (e.g., keyboard) for a key press event(s), according to certain embodiments. Method 1300 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1300 can be performed by aspects of system 200 (e.g., processor(s) 210), system 300, or a combination thereof. The novel method is described in operation with respect to embodiments, for example, as shown and described above with respect to FIGS. 8-12, however other implementations of hardware can be used as would be appreciated by one of ordinary skill in the art.

At operation 1310, method 1300 can include receiving, by one or more processors on the keyboard, a first signal from one of a plurality of subarrays (e.g., 920(1), 920(2), etc.), according to certain embodiments. In some aspects, each subarray of the plurality of subarrays including a different set of a plurality of hybrid key structures 910, each of the plurality of key structures including a first type of key switch (e.g., contact-based key switch, key switch 810) and a second type of key switch (e.g., contactless key switch, key switch 820), wherein the first signal is generated by the first type of key switch of at least one of the plurality of hybrid key structures of the one of the plurality of subarrays. The subarrays collectively form an array 905.

At operation 1310, method 1300 can include identifying the one of the plurality of subarrays where the first signal is generated, according to certain embodiments.

At operation 1320, method 1300 can include scanning the identified one of the plurality of subarrays for a second signal generated by the second type of key switch, according to certain embodiments. In some aspects, scanning the corresponding subarray includes driving the second type of key switch in each of the hybrid key structures in the corresponding subarray and reading their output for the generated second signal. Scanning the corresponding subarray for detecting the corresponding second signal may be performed in response to receiving the first signal. In some embodiments, the keyboard system generates a radio frequency (RF) report with key press data that includes all identified activated hybrid key structures within a scan period comprised of a plurality of scan intervals, and the corresponding subarray(s) are scanned during scan intervals of the plurality of scan intervals that are closest in time to a generation of a next RF report.

At operation 1330, method 1300 can include detecting the generated second signal from the identified one of the plurality of subarrays, according to certain embodiments.

At operation 1340, method 1300 can include identifying an activated key structure that is producing the generated second signal, according to certain embodiments.

At operation 1350, method 1300 can include registering a key press for the identified, activated key structure, according to certain embodiments. In some aspects, the first type of key switch is a contact-based key switch, and second type of key switch is a contactless key switch. In some cases, the first type of key switch is a galvanic mechanical key switch, and the second type of key switch is an optical key switch. Typically, the second type of key switch different than the first type of key switch. In some embodiments, the array includes rows and columns, wherein each column includes a plurality of rows of hybrid key structures, each column corresponds to one of the plurality of subarrays, and each column corresponds to a different one of the plurality of subarrays than the remaining columns. In some aspects, a key release is registered as well. Once the key press is sensed, the system continues to scan with the second (e.g., optical) sensing until a key release is detected.

It should be appreciated that the specific steps illustrated in FIG. 13 provides a particular method 1300 for partially scanning a computer peripheral device for a key press event, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A keyboard system comprising:
a plurality of hybrid key structures configured in an array, the array comprised of a plurality of subarrays,
wherein each of the plurality of key structures is configured within any one of the plurality of subarrays and includes:
a depressible element;
a first type of key switch configured to generate a first signal when the depressible element is activated; and
a second type of key switch configured to generate a second signal when the depressible element is activated; and
one or more processors communicatively coupled to each of the plurality of hybrid key structures and configured to, during a scan period comprised of a plurality of scan intervals:
receive the first signal from an activated hybrid key structure when its corresponding depressible element is activated;
determine a corresponding subarray that the activated hybrid key structure is configured within;

during a last scan interval of the plurality of scan intervals and independent of when the first signal is received, scan the corresponding subarray for a generated second signal;

detect the generated second signal from the corresponding subarray;

identify the activated hybrid key structure based on the detected, generated second signal; and register a key press for the identified activated hybrid key structure at an end of the scan period.

2. The keyboard system of claim 1 wherein the first type of key switch is a contact-based key switch, and wherein the second type of key switch is a contactless key switch.

3. The keyboard system of claim 1 wherein the first type of key switch is a galvanic mechanical key switch, and wherein the second type of key switch is an optical key switch.

4. The keyboard system of claim 1 wherein scanning the corresponding subarray includes driving the second type of key switch in each of the hybrid key structures in the corresponding subarray and reading their output for the generated second signal.

5. The keyboard system of claim 4 wherein scanning the corresponding subarray for detecting the corresponding second signal during the last scan interval is performed in response to receiving the first signal.

6. The keyboard system of claim 5 wherein generating the first signal consumes less than one tenth times a power of generating the second signal.

7. The keyboard system of claim 1 wherein the array includes rows and columns,
wherein each column includes a plurality of rows of hybrid key structures,
wherein each column corresponds to one of the plurality of subarrays, and
wherein each column corresponds to a different one of the plurality of subarrays than the remaining columns.

8. The keyboard system of claim 7 further comprising a multiplexor (MUX) configured to consolidate a total number of rows and columns by sharing same rows and columns resulting in a fewer number of input/output (I/Os) lines in the keyboard system.

9. The keyboard system of claim 1 wherein the one or more processors are disposed in the keyboard system.

10. A method of operating an input device, the method comprising:
receiving, by one or more processors on the input device during a scan period comprised of a plurality of scan intervals, a first signal from one of a plurality of subarrays, each subarray of the plurality of subarrays including a different set of a plurality of hybrid key structures, each of the plurality of key structures including a first type of key switch and a second type of key switch, wherein the first signal is generated by the first type of key switch of at least one of the plurality of hybrid key structures of the one of the plurality of subarrays, wherein the plurality of subarrays in combination form an array;

identifying the one of the plurality of subarrays where the first signal is generated;

during a last scan interval of the plurality of scan intervals and independent of when the first signal is received, scanning the identified one of the plurality of subarrays for a second signal generated by the second type of key switch;

detecting the generated second signal from the identified one of the plurality of subarrays;

identifying an activated key structure that is producing the generated second signal; and at an end of the scan period, registering a key press for the identified, activated key structure.

11. The method of claim 10 wherein the first type of key switch is a contact-based key switch, and
wherein the second type of key switch is a contactless key switch.

12. The method of claim 10 wherein the first type of key switch is a galvanic mechanical key switch, and
wherein the second type of key switch is an optical key switch.

13. The method of claim 10 wherein the second type of key switch is different than the first type of key switch.

14. The method of claim 10 wherein scanning the identified one of the plurality of subarrays includes driving the second type of key switch in each of the hybrid key structures in the identified one of the plurality of subarrays and reading their output for the generated second signal.

15. The method of claim 10 wherein scanning the identified one of the plurality of subarrays for detecting the detected, generated second signal during the last scan interval is performed in response to receiving the first signal.

16. The method of claim 10 wherein the array includes rows and columns,
wherein each column includes a plurality of rows of hybrid key structures,
wherein each column corresponds to one of the plurality of subarrays, and
wherein each column corresponds to a different one of the plurality of subarrays than the remaining columns.

17. The method of claim 10 wherein the one or more processors are disposed in the input device.

18. The method of claim 10 wherein the input device is a keyboard.

* * * * *